United States Patent [19]

Cote

[11] 4,136,265
[45] Jan. 23, 1979

[54] HAND-HELD MICROPHONE ASSEMBLY
[75] Inventor: Paul L. Cote, Windham, N.H.
[73] Assignee: Gentex Corporation, Carbondale, Pa.
[21] Appl. No.: 827,219
[22] Filed: Aug. 24, 1977
[51] Int. Cl.$^2$ .............................................. H04M 1/04
[52] U.S. Cl. ................................ 179/146 R; 200/157; 179/167
[58] Field of Search ............................ 179/167, 111 R; 325/111, 118, 16

[56] References Cited

U.S. PATENT DOCUMENTS

| | | | |
|---|---|---|---|
| 2,533,493 | 12/1950 | Mitchell | 325/16 |
| 3,065,352 | 11/1962 | McFarlane | 325/111 X |
| 3,564,416 | 2/1971 | Price | 325/111 |

FOREIGN PATENT DOCUMENTS 275625  10/1969  Austria ................................ 179/146 R Primary Examiner—William C. Cooper
Attorney, Agent, or Firm—Shenier & O'Connor

[57] ABSTRACT

A hand-held microphone assembly for use with two-way communications equipment in which an electret-capacitor microphone is mounted in the upper surface of the barrel portion of a pistol-shaped casing. A push-to-talk trigger disposed at the end of the barrel actuates a double-pole, double-throw slide switch to couple the output of a local preamplifier in the casing to an audio output line leading from the casing and to make suitable couplings between three changeover lines. A resilient conductive strip disposed within the casing at the inner end of the slider element is actuated in response to the operation of the double-pole switch to couple the preamplifier to a normally disconnected amplifier power supply in the casing.

15 Claims, 7 Drawing Figures

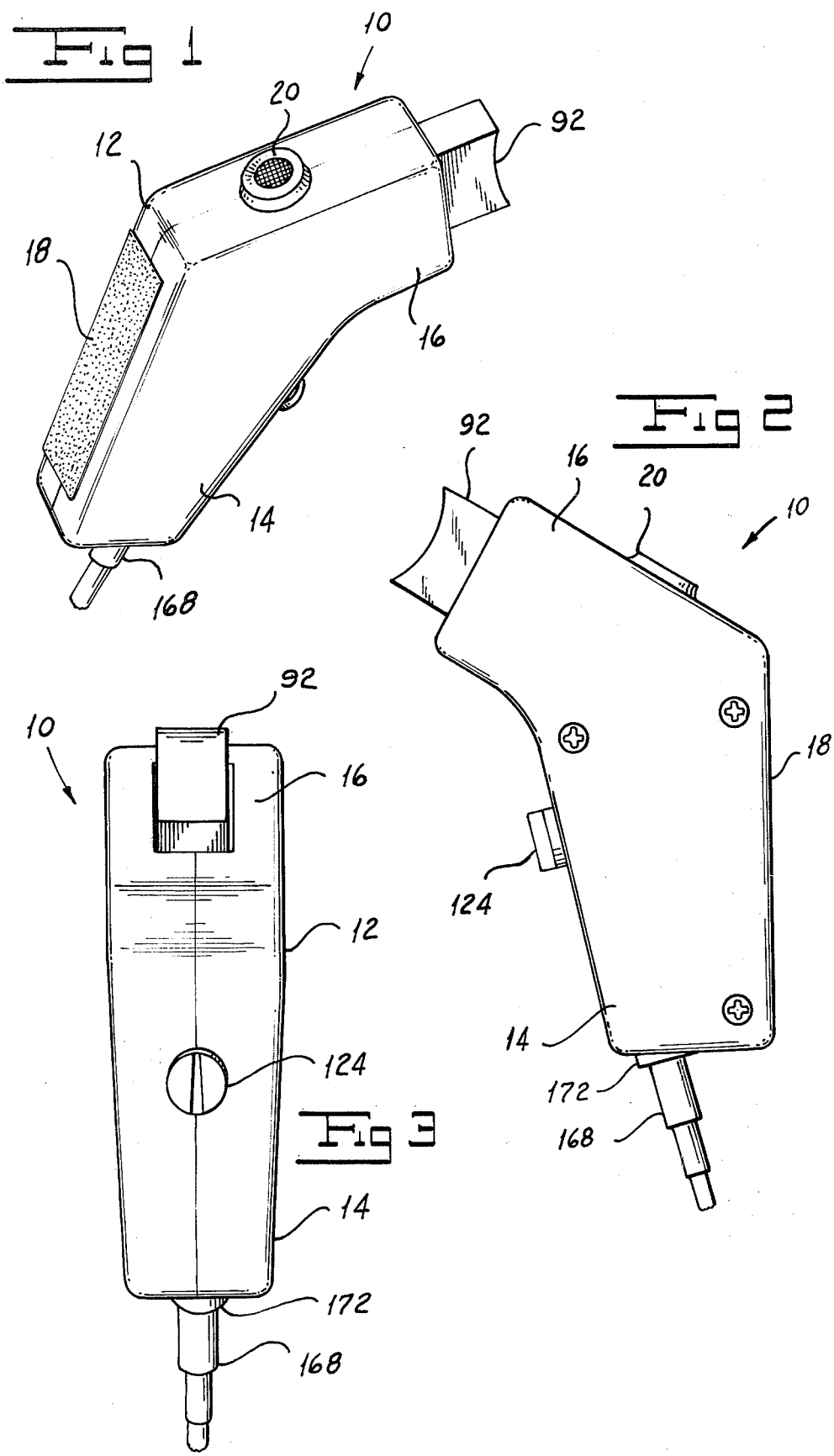

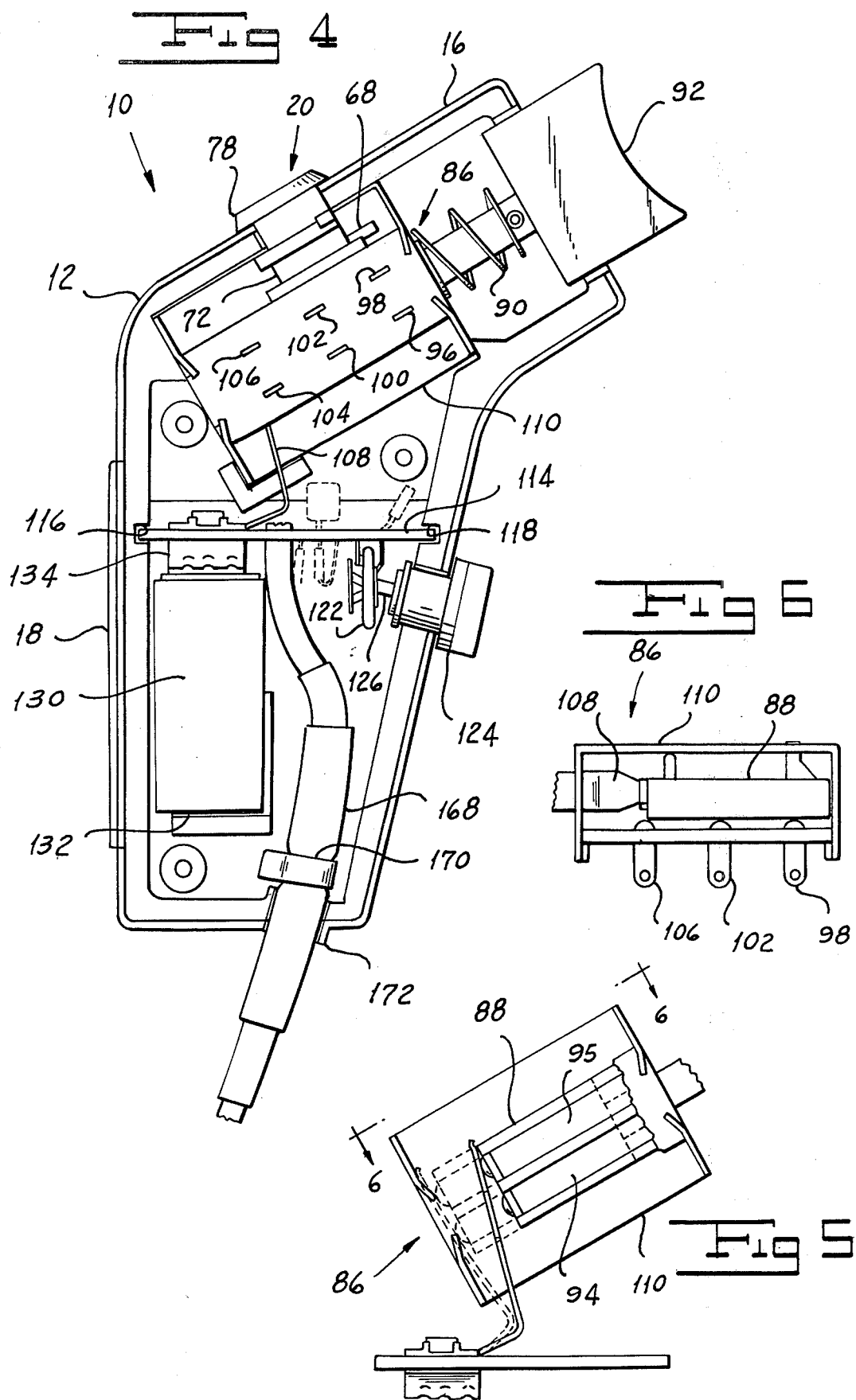

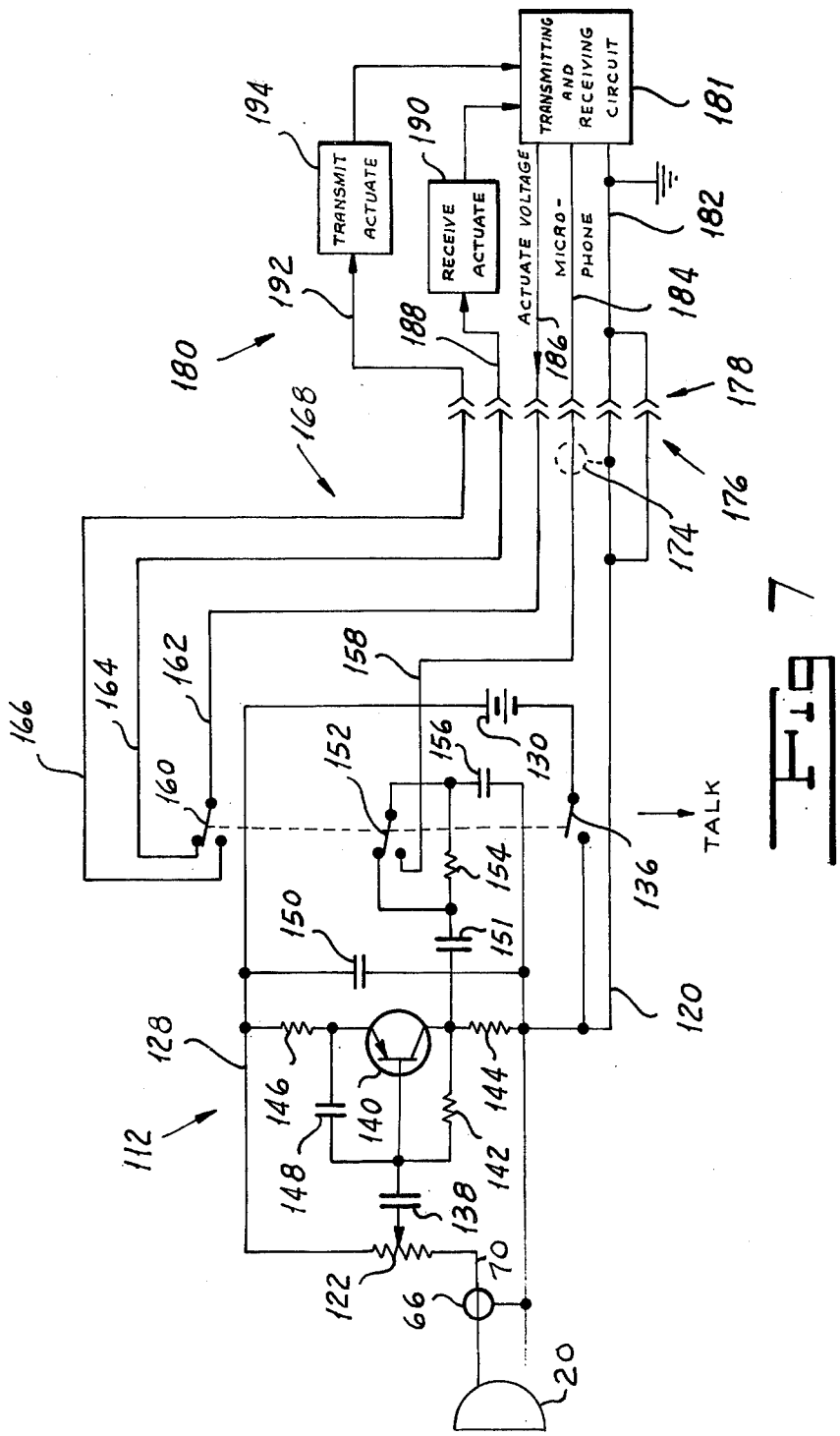

HAND-HELD MICROPHONE ASSEMBLY

BACKGROUND OF THE INVENTION

Hand-held microphones designed for use with two-way communications equipment such as mobile radios are well known in the art. Generally, microphones of this type employ relatively large carbon or electrodynamic transducer elements. One of the defects of such microphones of the prior art, especially when used in mobile radios, is their awkwardness in handling with both hands on the steering wheel of a motor vehicle. Driving a motor vehicle with only one hand on the steering wheel while using the other hand to hold such a microphone is inherently dangerous and merely using a small transducer element does not entirely solve the problem described above. That is, where a relatively small transducer element is employed, it will not produce a sufficiently large output signal when held at an appreciable distance from the speaker's mouth, as at the steering wheel of a motor vehicle where the operator is the speaker.

SUMMARY OF THE INVENTION

One of the objects of my invention is to provide a microphone assembly for a mobile radio which is compact and is easily handled.

Another object of my invention is to provide a microphone assembly which may be used in a motor vehicle while keeping both hands on the steering wheel.

A further object of my invention is to provide a compact microphone assembly which can be held in the hand of the operator of a motor vehicle and which will put out a sufficiently strong signal at this distance from the operator's mouth.

Still another object of my invention is to provide a microphone assembly which is compatible with existing transceivers.

Other and further objects will be apparent from the following description.

In general, my invention contemplates the provision of a microphone assembly having a compact casing adapted to be held easily in the hand of a motor vehicle operator with both hands on the wheel and in which a microphone is mounted on the casing and an amplifier and an amplifier power supply battery are supported within the casing. A trigger mounted on the casing is adapted to be actuated to operate a double-pole switch within the casing while a single-pole switch in the casing is operated in response to operation of the double-pole switch to provide three switching functions which may be to connect the power supply battery to the amplifier, to connect the amplifier to an output line and to control a changeover circuit including a control line leading from the casing to a remote transducer.

In another aspect, my invention contemplates a hand-held microphone assembly in which a casing having a prehensible stock, adapted to be substantially entirely received in the hand of a user which at the same time securely grips the steering wheel of a motor vehicle, has a microphone mounted thereon and a trigger mounted therein at one end of the stock. The trigger is normally urged in a direction away from the stock, but is movable along a line forming an obtuse angle with the stock to provide a signal from the microphone on an output line. The above-described arrangement results in an assembly in which the thumb and remote three fingers grip the stock while the index finger naturally curls over the trigger to provide a ready pistol-grip action. The assembly can readily be used at the steering wheel simply by wrapping the thumb and remote three fingers around the stock and the steering wheel.

BRIEF DESCRIPTION OF THE DRAWINGS

In the accompanying drawings which form part of the instant specification and which are to be read in conjunction therewith and in which like reference numerals indicate like parts in the various views.

FIG. 1 is a perspective view of my microphone assembly.

FIG. 2 is a left side elevation of the assembly shown in FIG. 1.

FIG. 3 is a rear elevation of the assembly shown in FIG. 1.

FIG. 4 is a right side elevation of the assembly shown in FIG. 1, with the right half of the casing removed to show the arrangement of the internal parts.

FIG. 5 is a fragmentary right side elevation of the switch assembly shown in FIG. 4, with parts broken away.

FIG. 6 is a view of the switch assembly shown in FIG. 5, taken along line 6—6 thereof.

FIG. 7 is a schematic diagram of the electronic circuit portion of the assembly shown in FIG. 1, showing its connection to a transceiver.

DETAILED DESCRIPTION OF THE PREFERRED EMBODIMENT

Referring now to the drawings, my microphone assembly, indicated generally by the reference character 10, is housed in a generally pistol-shaped casing 12 comprising a stock 14 and a barrel 16 forming an obtuse angle with the stock 14. Preferably, the casing 12 is formed as right and left halves from a suitable synthetic resin with a conductive interior coating such as silver paint to minimize electromagnetic interference. I provide a strip 18 having a multiplicity of loop fastener elements on the front face of the stock 14 to permit ready attachment to and detachment from a mating strip (not shown) having hook fasteners and mounted on an automobile dashboard, for example. Suitable such strips are sold by American Velcro, Inc. under the trademark "Velcro".

The casing 12 is shaped and dimensioned in such a manner as to provide a ready pistol-grip action. Thus, the front face of the stock 14 and the upper face of the barrel 16 are about 2½ inches long and 1¾ inches long, respectively, and join at an angle of about 120°. The stock 14 tapers along its length from a front-to-back thickness of about 1½ inches where it joins the barrel 16 to about 1 inch at its lower end. The side-to-side width of the casing 12 also tapers from 0.9 inch at the barrel 16 to 0.7 inch at the lower end of the stock 14. The barrel 16 measures about 1 inch in the direction perpendicular to its upper face to accommodate a switch assembly to be described, and has a lower face about ½ inch long owing to the tapered construction of the stock 14.

The barrel 16 carries on its upper side an electret-capacitor microphone 20 of any suitable type known to the art. Preferably, the microphone 20 is electrically isolated from the outer metal housing 78 by a plastic sleeve 72 to prevent the operator from suffering "RF burn" if he should accidentally touch or approach the transceiver antenna. One of the terminals of microphone 20 is coupled to the outer conductor 66 of a coaxial line 68, while the other terminal is connected to the inner conductor 70 of line 68. To optimize the signal-to-noise ratio, microphone 20 should have a frequency response between 200 Hz and 6000 Hz, approximately, with a rising response between 200 Hz and about 2500 Hz. Such a response may be obtained either mechanically or electrically through the use of any suitable means known to the art.

Even with its built-in preamplifier the microphone 20 will not put out an adequate signal for use with most existing two-way radios. I provide my hand-held microphone assembly with an additional stage of amplification from an amplifier circuit indicated generally by the reference character 112. Circuit 112 is contained on a transversely arranged printed circuit board 114 slidably received by respective slots 116 and 118 in the stock 14 of the casing 12. More particularly, I couple the outer conductor 66 of cable 68 to an amplifier ground line 120, while I couple the ungrounded line 70 to one end of a gain control potentiometer 122. Potentiometer 122 is mechanically controlled by a knob 124 rotatably supported on the inner, or rear, portion of the stock 14. A tab 126 of the knob 124 engages a slot (not shown) of the potentiometer brush to provide a flexible coupling between the knob 124 and the potentiometer 122.

I connect the other end of potentiometer 122 to a positive supply line 128 coupled to the positive terminal of a 7.5-volt battery 130. While it might be possible to obtain an adequate DC voltage for the amplifier from the transceiver itself, this not only would require modification of the transceiver but also might introduce other problems as, for example, extraneous noise pickup. Battery 130 is disposed in the lower portion of the stock 14 between a negative battery contact 134 carried by the circuit board 114 and a positive contact 132 secured to the casing 12. A normally open switch 136 connects the negative contact 134 to the ground line 120. Potentiometer 122 and battery 130 complete the amplification circuit associated with microphone 20. Potentiometer 122 serves as load resistor in the microphone circuit.

A coupling capacitor 138 connects the tap of potentiometer 122 to the base of a PNP transistor 140 providing the second stage of amplification. A biasing resistor 142 connects the collector to the base of transistor 140, while a load resistor 144 couples the collector to ground line 120. A resistor 146 couples the emitter of transistor 140 to the positive supply line 128. A capacitor 148 connects the emitter of transistor 140 to the base to provide an RF bypass. I place a filter capacitor 150 between the positive supply line 128 and the amplifier ground line 120.

Transistor 140 is arranged in a common-emitter figuration having a relatively low output impedance (determined by load resistor 144) to minimize the pickup of hum or noise and to match the input impedance of the transceiver. The collector of transistor 140 is connected through a coupling capacitor 151 to the normally open contact of a double-throw switch 152 and to the common terminal through a resistor 154. A capacitor 156 connects the common terminal of switch 152 to amplifier ground line 120 to provide RF bypass and also to help shape the frequency response. The normally closed contact of switch 152 is connected to an audio output line 158. A double-throw switch 160, used to actuate the transmitting and receiving circuits of the transceiver, has its common terminal 102 coupled to a line 162, its normally closed terminal 98 to a line 164 and its normally open terminal to a line 166.

A cable 168 carries lines 120, 158, 162, 164 and 166 to a plug assembly 176, which is received by a mating jack assembly 178 of a transceiver indicated generally by the reference character 180. A shield 174 surrounds line 158. Cable 168 extends through an outlet 172 provided at the bottom of the stock 14. A clamp 170 secured around cable 168 on the inner side of the outlet 172 prevents the wires of the cable from being pulled loose from the various connecting points. The shield 174 of the cable 168 is connected to the ground line 120 of the microphone assembly 10. Ground line 120 is connected through the plug assembly 176 and the jack assembly 178 to the ground line 182 of the transmitting and receiving circuit 181 of the transceiver 180. Similarly, output line 158 is coupled to a microphone input line 184 to the transmitting and receiving circuit 181.

A line 186 carrying an appropriate actuating voltage from the transmitting and receiving circuit 181 drives the common line 162 to switch 160. The normally open line 164 to switch 160 is connected through plug 176 and receptacle 178 to a line 188 driving a receive actuate circuit 190 which is part of the changeover circuit of the transceiver 180. Circuit 190, when coupled to the actuating voltage line 186 through switch 160, provides an actuating signal to the transmitting and receiving circuit 181 to place it in a receiving mode. In a similar manner, normally open line 166 feeds a line 192 driving a transmit actuate circuit 194 which also is part of the transceiver changeover circuit. Circuit 194, when coupled to line 186 through switch 160, provides a suitable actuating signal to the transmitting and receiving circuit 181 to place it in a transmitting mode. While many presently available transceivers have changeover circuits responsive to only two lines or even only to one line, other than ground, the provision of three switch outputs isolated from ground maximizes the compatibility of my assembly with existing equipment.

Normally, switches 136, 152 and 160 are in positions shown in FIG. 7. The negative terminal of battery 130 is disconnected from the amplifier ground line 120 so that the amplifier 112 remains unenergized. Line 158 coupled to the microphone input line 184 remains disconnected, while line 186 is coupled to line 188 through switch 160 to place the transmitting and receiving circuit 181 in a receiving mode. When the operator wishes to transmit, he presses a trigger 92, to be described, simultaneously actuating switches 136, 152 and 160. As a result, the battery 130 is connected to the ground line 120 to energize the circuit 112, microphone input line 184 is coupled to the collector output of transistor 140 through switch 152 and resistor 154, and line 186 is coupled to line 192 through switch 160 to place the transmitting and receiving circuit 181 in a transmitting mode of operation. The operator may adjust the modulation to a suitable level by turning the control knob 124 of the potentiometer 122 to an appropriate position.

As is apparent from the foregoing description, the operation of the assembly requires simultaneous actuation of two double-throw switches as well as one single-throw normally open switch. Moreover, in my arrangement these three independent switching functions must be achieved within the geometric constraints imposed by the external design of my hand-held microphone casing.

I provide a double-pole double-throw switch assembly 86 comprising a sliding element 88 urged into a normal position by a spring 90 disposed between a trigger 92 and the switch frame 110. Switch assembly 86 is disposed so that the trigger 92 extends outwardly from the end of the barrel 16. In the normal position of switch assembly 86, a first conductive strip 94 on the sliding element 88 connects fixed contacts 96 and 100, while a second conductive strip 95 couples fixed contacts 98 and 102. By squeezing the trigger 92, the sliding element 88 is urged into a position shown in dotted lines FIG. 5 in which conductive strip 94 couples fixed contacts 100 and 104 while conductive strip 95 couples fixed contacts 102 and 106.

I dispose a resilient metal strip 108, integrally formed with negative battery contact 134, in such a manner that the sliding element 88 bears against the metal strip 108 to urge it against the metal switch frame 110. Switch assembly 86 thus comprises an additional single-throw switch element in which the fixed contact is the switch frame 110 and the movable contact is the resilient metal strip 108. In the amplifier circuit described above, switch contacts 96, 100 and 104 form double-throw switch 152, switch contacts 98, 102, and 106 form double-throw switch 160, and metal strip 108 and frame 110 form normally open single-throw switch 136.

It will be seen that I have accomplished the objects of my invention. By providing a pistol-grip geometry in which a push-to-talk trigger is movable along a line forming an obtuse angle with the stock, I have constructed a microphone assembly which readily fits into the palm of the hand with the thumb and three remote fingers wrapping around the stock and steering wheel of a motor vehicle and with the index finger wrapping around the trigger. By providing a switched local battery, I am able to use an extremely compact electret condenser microphone while insuring compatability with existing transceivers. Finally, by providing a triple-pole switch assembly comprising a double-pole switch and a coupled single-pole switch, I am able to optimize the internal parts arrangement, given the switching requirements of the electrical circuit and the geometrical constraints imposed by the external configuration.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A hand-held microphone assembly including in combination a generally elongated prehensible casing; a microphone; means mounting said microphone on said casing; an amplifier in said casing; means coupling said microphone to said amplifier; a battery in said casing adapted to act as a power source for said amplifier; an output line and a control line running outwardly from said casing; a double-pole slide switch assembly mounted in the direction of the length of said casing, said switch assembly comprising first and second transversely spaced switches each including a first fixed contact and a second contact movable between a first position out of engagement with the first contact and a second position in engagement with the first contact, said switch assembly including a movable slider element mounting the movable contacts of said switches for movement as a unit and means for biasing the second contact of each of said switches to said first position; manually operable means on said housing for moving said slider element to move the second contact of each of said first and second switches from its first position to its second position; and a third switch disposed at the end of said slide switch assembly remote from said first position, said third switch including a first fixed contact and a second contact movable between a first position out of engagement with its associated first contact and means for biasing said third switch second contact to its first position, said second contact of said third switch being so disposed relative to said slider element that movement of said element in response to said manually operable means urges said second contact against said first contact of said third switch in conductive contact therewith, one of said switches being adapted to connect said battery to said amplifier, another of said switches adapted to connect said amplifier to said output line, another of said switches being connected in said control line.

2. An assembly as in claim 1 in which the second contact of the third switch comprises a resilient conductive strip disposed in such a manner that movement of the slider element urges said strip into engagement with the first contact of said third switch.

3. An assembly as in claim 2 in which the first contact of said third switch comprises a metal frame supporting the contacts of said double-pole switch assembly.

4. An assembly as in claim 2 including a pair of battery contacts, said resilient strip being integrally formed with one of said battery contacts.

5. An assembly as in claim 1 in which said microphone is a capacitor microphone.

6. An assembly as in claim 1 in which said microphone comprises an electret.

7. An assembly as in claim 2 in which said slide switch includes a push button attached to said slider element, said push button extending out one end of said casing.

8. An assembly as in claim 2 in which said casing comprises a prehensible stock portion and an angled portion forming an angle with said stock portion, said slide switch being disposed in said angled portion, said second contact of said third switch comprising a resilient conductive strip disposed with a fixed end thereof on the side of said slide switch facing said stock portion.

9. An assembly as in claim 8 in which said battery is disposed lengthwise in said stock portion, said assembly further including a pair of battery contacts, said resilient strip being integrally formed with one of said battery contacts.

10. An assembly as in claim 9 in which said amplifier comprises a circuit board disposed in said stock portion between said battery and said double-pole switch, said circuit board supporting said one battery contact and said resilient strip.

11. An assembly as in claim 10 in which said amplifier comprises a potentiometer mounted on said circuit board, said assembly further including a knob rotatably received by said casing and means for coupling said knob to said potentiometer.

12. An assembly as in claim 2 in which each of the switches of said double-pole switch assembly further includes a third switch contact in engagement with said second switch contact in said first position and out of engagement with said second switch contact in said second position.

13. An assembly as in claim 12 including three control lines coupled to respective contacts of one of the switches of said double-pole switch assembly.

14. An assembly as in claim 12 in which said battery is coupled to said amplifier through said third switch.

15. A hand-held microphone assembly including in combination a generally elongated prehensible casing; a microphone; means mounting said microphone on said casing; an amplifier in said casing, means coupling said microphone to said amplifier; a battery in said casing adapted to act as a power source for said amplifier; an output line and a control line running outwardly from said casing; a double-pole slide switch assembly mounted in the direction of the length of said casing; said switch assembly comprising first and second transversely spaced switches each including a first fixed contact and a second contact movable between a first position out of engagement with the first contact and a second position in engagement with the first contact, said switch assembly including a movable slider element mounting the movable contacts of said switches for movement as a unit, means for biasing the second contact of each of said switches to said first position, and a metal frame supporting the contacts of said slide switch assembly, said frame having a portion limiting the movement of said slider element against the force of said biasing means; manually operable means on said housing for moving said slider element to move the second contact of each of said first and second switches from its first position to its second position; and a resilient conductive strip mounted with a free end disposed between said slider element and said movement-limiting frame portion, said strip being normally spaced from said frame portion but being urged against said portion in conductive contact therewith in response to movement of said slider element against the force of said biasing means to form a third normally open switch, one of said switches being adapted to connect said battery to said amplifier, another of said switches adapted to connect said amplifier to said output line, another of said switches being connected in said control line.

* * * * *

UNITED STATES PATENT AND TRADEMARK OFFICE
CERTIFICATE OF CORRECTION

PATENT NO. : 4,136,265
DATED : January 23, 1979
INVENTOR(S) : Paul L. Cote

It is certified that error appears in the above-identified patent and that said Letters Patent are hereby corrected as shown below:

Column 6, line 35, "claim 2" should read -- claim 1 --;

line 38, "claim 2" should read -- claim 1 --;

line 60, "claim 2" should read -- claim 1 --.

Signed and Sealed this

Tenth Day of April 1979

[SEAL]

Attest:

RUTH C. MASON
Attesting Officer

DONALD W. BANNER
Commissioner of Patents and Trademarks